(12) United States Patent
Griggs

(10) Patent No.: US 12,604,107 B2
(45) Date of Patent: Apr. 14, 2026

(54) IMAGE CAPTURE DEVICES WITH REDUCED STITCH DISTANCES

(71) Applicant: GoPro, Inc., San Mateo, CA (US)

(72) Inventor: Ian Copeland Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 99 days.

(21) Appl. No.: 18/383,939

(22) Filed: Oct. 26, 2023

(65) Prior Publication Data

US 2024/0155255 A1 May 9, 2024

Related U.S. Application Data

(60) Provisional application No. 63/422,680, filed on Nov. 4, 2022.

(51) Int. Cl.
*H04N 23/90* (2023.01)
*H04N 23/54* (2023.01)

(52) U.S. Cl.
CPC ............. *H04N 23/90* (2023.01); *H04N 23/54* (2023.01)

(58) Field of Classification Search
CPC ........ H04N 23/90; H04N 23/54; H04N 23/45; H04N 23/55; H04N 23/698; G02B 7/022; G02B 7/025
See application file for complete search history.

(56) References Cited

U.S. PATENT DOCUMENTS

| 751,347 | A | 2/1904 | Scheimpflug |
| 3,760,704 | A | 9/1973 | Baker |
| 3,818,498 | A | 6/1974 | Zehnpfennig |
| 4,109,263 | A | 8/1978 | Johnson |
| 4,119,980 | A | 10/1978 | Baker |
| 5,471,027 | A | 11/1995 | Call |
| 5,721,585 | A | 2/1998 | Keast |
| 6,097,598 | A | 8/2000 | Miyahara |

(Continued)

FOREIGN PATENT DOCUMENTS

| JP | 2004020798 A | 1/2004 |
| JP | 2006086752 A | 3/2006 |

(Continued)

OTHER PUBLICATIONS

International Search Report and Written Opinion for App. No. PCT/US2021/019970, dated Jun. 3, 2021, 9 pages.

(Continued)

*Primary Examiner* — Hung H Lam

(74) *Attorney, Agent, or Firm* — Young Basile Hanlon & MacFarlane, P.C.

(57) ABSTRACT

An image capture device is disclosed that includes: a body; a first integrated sensor-lens assembly (ISLA) that is supported by the body and which is oriented in a first direction; and a second ISLA that is supported by the body and which is oriented in a second direction that is opposite to the first direction. The first ISLA and the second ISLA are each configured in a tilted orientation so as to define first and second stitch distances that are unequal, which inhibits (if not entirely prevents) the inclusion of extraneous objects in the captured content and improves the overall quality of the (spherical) image that is ultimately output (generated) by the image capture device.

20 Claims, 8 Drawing Sheets

(56) References Cited

U.S. PATENT DOCUMENTS

| | | | | |
|---|---|---|---|---|
| D467,259 | S | 12/2002 | Hung | |
| 6,726,331 | B2 | 4/2004 | Miyata | |
| 7,329,869 | B2 | 2/2008 | Cassel | |
| 8,274,550 | B2* | 9/2012 | Steuart, III | H04N 13/246 |
| | | | | 348/42 |
| 9,025,080 | B2 | 5/2015 | Samuels | |
| 9,456,113 | B2 | 9/2016 | Masuda | |
| 9,607,358 | B2 | 3/2017 | Takenaka | |
| 9,736,372 | B2 | 8/2017 | Masuda | |
| 9,860,970 | B2 | 1/2018 | Tolbert | |
| 9,910,342 | B2 | 3/2018 | Samuels | |
| 9,992,414 | B2 | 6/2018 | Masuda | |
| 10,382,681 | B2 | 8/2019 | Masuda | |
| 10,404,912 | B2 | 9/2019 | Ogawa | |
| 10,613,420 | B2 | 4/2020 | Ali | |
| 10,652,458 | B2 | 5/2020 | Kang | |
| 10,656,689 | B2 | 5/2020 | Kilgore | |
| 10,666,360 | B2 | 5/2020 | Saathoff | |
| 10,666,860 | B2 | 5/2020 | Takenaka | |
| 10,701,249 | B1 | 6/2020 | Guo | |
| 10,855,919 | B2 | 12/2020 | Masuda | |
| 10,855,979 | B2 | 12/2020 | Pace | |
| 11,146,711 | B1 | 10/2021 | Crow | |
| 11,277,545 | B2 | 3/2022 | Crow | |
| 12,075,141 | B2 | 8/2024 | Vitale | |
| 12,081,848 | B2 | 9/2024 | Vitale | |
| 2002/0057337 | A1 | 5/2002 | Kumler | |
| 2003/0128536 | A1 | 7/2003 | Radu | |
| 2003/0202328 | A1 | 10/2003 | Deeney | |
| 2004/0169771 | A1 | 9/2004 | Washington | |
| 2006/0100336 | A1 | 5/2006 | Fukui | |
| 2007/0002131 | A1 | 1/2007 | Ritchey | |
| 2007/0062905 | A1 | 3/2007 | Hung | |
| 2008/0056695 | A1 | 3/2008 | Huang | |
| 2008/0205881 | A1 | 8/2008 | Sakurai | |
| 2009/0040291 | A1 | 2/2009 | McCall | |
| 2009/0274953 | A1 | 11/2009 | Myers | |
| 2010/0245539 | A1* | 9/2010 | Lin | H04N 23/698 |
| | | | | 348/E7.001 |
| 2010/0296805 | A1 | 11/2010 | Mayer | |
| 2011/0127912 | A1 | 6/2011 | Lee | |
| 2011/0194009 | A1 | 8/2011 | Park | |
| 2012/0023177 | A1 | 1/2012 | Linden | |
| 2012/0035418 | A1 | 2/2012 | Talbert | |
| 2014/0055671 | A1 | 2/2014 | Kawamura | |
| 2014/0160284 | A1 | 6/2014 | Achenbach | |

| | | | | |
|---|---|---|---|---|
| 2015/0365569 | A1 | 12/2015 | Mai | |
| 2016/0212409 | A1* | 7/2016 | Cole | H04N 23/50 |
| 2016/0307372 | A1* | 10/2016 | Pitts | H04N 23/957 |
| 2016/0349601 | A1 | 12/2016 | Kungl | |
| 2017/0054907 | A1 | 2/2017 | Nishihara | |
| 2017/0070652 | A1 | 3/2017 | Müller | |
| 2017/0156205 | A1 | 6/2017 | Liu | |
| 2017/0195531 | A1 | 7/2017 | Warren | |
| 2017/0195533 | A1 | 7/2017 | Seo | |
| 2017/0200992 | A1 | 7/2017 | Piggott | |
| 2017/0294694 | A1 | 10/2017 | Tso | |
| 2018/0070003 | A1* | 3/2018 | Ramseyer | H04N 23/90 |
| 2018/0107099 | A1 | 4/2018 | Yasuda | |
| 2018/0259831 | A1 | 9/2018 | Chiu | |
| 2019/0041600 | A1 | 2/2019 | Sakamoto | |
| 2019/0056643 | A1 | 2/2019 | Chang | |
| 2019/0163037 | A1 | 5/2019 | Koyama | |
| 2019/0346126 | A1 | 11/2019 | Wada | |
| 2020/0033774 | A1 | 1/2020 | Shinji | |
| 2020/0064533 | A1 | 2/2020 | Miyazaki | |
| 2020/0351419 | A1 | 11/2020 | Sharma | |
| 2020/0413567 | A1 | 12/2020 | Chusseau | |
| 2021/0033815 | A1 | 2/2021 | Lin | |
| 2021/0122299 | A1 | 4/2021 | Garcia | |
| 2021/0306536 | A1 | 9/2021 | Vitale | |
| 2022/0124226 | A1 | 4/2022 | Jeong | |
| 2023/0009451 | A1 | 1/2023 | Connolly | |
| 2024/0073506 | A1 | 2/2024 | Vitale | |

FOREIGN PATENT DOCUMENTS

| | | | |
|---|---|---|---|
| JP | 2008015476 | A | 1/2008 |
| JP | 2009278584 | A | 11/2009 |
| JP | 5322866 | B2 | 10/2013 |
| JP | 2017073634 | A | 4/2017 |

OTHER PUBLICATIONS

International Search Report and Written Opinion for App. No. PCT/US2021/026140, dated Jul. 1, 2021, 10 pages.

U.S. Appl. No. 16/803,139, filed Feb. 27, 2020, Crow et al.

Randall Hand, "Immersive Media's Dodeca 2360 Spherical Video Camera", VizWorld, Nov. 12, 2025, 4 pages.

The Magazine of Panoramic Imaging, Jun.-Jul. 1996, vol. 13, No. 3, 20 pages.

The Magazine of Panoramic Imaging, Mar.-Apr. 1996, vol. 13, No. 2, 20 pages.

* cited by examiner

300

302

380

CAPTURE COMPONENT(S)    310

IMAGE SENSOR(S)
312

MICROPHONE(S)
314

PROCESSING APPARATUS    320

DATA INTERFACE COMPONENT(S)    330

I/O INTERFACE
332

WIRELESS
334

STORAGE
336

MOVEMENT SENSORS    340

POSITION
342

ACCELER.
344

GYROSCOPE
346

POWER COMPONENTS    350

BAT. INTERFACE
352

BATTERY
354

EXT. INTERFACE
356

USER INTERFACE
COMPONENTS    360

VISUAL OUTPUT
362

LIGHT(S)
364

DISPLAY(S)
366

SPEAKER(S)
368

PHYS. INPUT
370

MICROPHONE(S)
314

IMAGE CAPTURE DEVICES WITH REDUCED STITCH DISTANCES

CROSS-REFERENCE TO RELATED APPLICATION

This application claims the benefit of and priority to U.S. Provisional Patent Application No. 63/422,680, filed Nov. 4, 2022, the entire disclosure of which is hereby incorporated by reference.

TECHNICAL FIELD

The present disclosure relates to image processing in image capture devices. More specifically, the present disclosure relates to the reduction of stitch distances in omnidirectional (e.g., spherical) image capture devices to improve image quality.

BACKGROUND

Image capture devices are used in a variety of applications, including, for example, handheld cameras and video recorders, cell phones, drones, vehicles, etc. Image capture devices typically include an optical module with one or more lenses (optical elements), which capture content by receiving and focusing light, and one or more image sensors, which convert the captured content into an electronic image signal that is processed by an image signal processor to form an image. In some image capture devices, the lens(es) and the image sensor(s) are combined into a single unit, which is known as an integrated sensor-lens assembly (ISLA).

Omnidirectional image capture devices typically include a pair of ISLAs that are oriented in opposite (e.g., front and rear) directions. The ISLAs define fields-of-view that overlap at stitch points, which allows the images captured by the ISLAs to be stitched together (at the stitch points) during image processing to generate a single, 360 degree spherical image.

Often times, however, extraneous objects may be inadvertently included in the captured content such as, for example, the user's hand, a corner of the image capture device, a mount or an accessory for the image capture device (e.g., a hand-held support, a tripod, a helmet), etc. As a countermeasure, the image capture device may be configured to (artificially) increase the stitch distances (e.g., the spacing between the lenses and the stitch points) so as to inhibit (if not entirely prevent) the inclusion of extraneous objects in the captured content. Increased stitch distances, however, can result in reduced image quality due to pixel sacrifice, loss of resolution, etc.

An opportunity thus remains for improvements in image capture and processing in omnidirectional image capture devices. The present disclosure addresses this opportunity and describes omnidirectional image capture devices with improved image capture capabilities that allow for the exclusion of extraneous objects from spherical images with reduced stitch distances.

SUMMARY

In one aspect of the present disclosure, an image capture device is disclosed that includes: a body; a first integrated sensor-lens assembly (ISLA) that is supported by the body and which is oriented in a first direction so as to define a first optical axis; and a second ISLA that is supported by the body and which is oriented in a second direction that is opposite to the first direction so as to define a second optical axis that extends in non-parallel relation to the first optical axis.

In certain embodiments, the first ISLA and the second ISLA may each be configured in a tilted orientation.

In certain embodiments, the body may define: a front surface that supports the first ISLA; a rear surface that supports the second ISLA; a top surface, a bottom surface, a first lateral surface, and a second lateral surface that each extend between the front surface and the rear surface; a depth that extends between the front surface and the rear surface; a height that extends between the top surface and the bottom surface; and a width that extends between the first lateral surface and the second lateral surface.

In certain embodiments, the first ISLA and the second ISLA may each be configured such that the first optical axis and the second optical axis respectively subtend first and second angles with a reference axis that extends in generally parallel relation to the depth of the image capture device.

In certain embodiments, the first and second angles may be acute.

In certain embodiments, the first and second angles may lie substantially within the range of approximately 5 degrees to approximately 45 degrees.

In certain embodiments, the first and second angles may generally identical.

In certain embodiments, the first ISLA and the second ISLA may be eccentrically positioned along the height of the body.

In certain embodiments, the first ISLA and the second ISLA may be positioned generally adjacent to the bottom surface of the body.

In certain embodiments, the first ISLA and the second ISLA may be positioned generally adjacent to the top surface of the body.

In certain embodiments, the first ISLA and the second ISLA may be eccentrically positioned along the width of the body.

In certain embodiments, the first ISLA and the second ISLA may be misaligned.

In another aspect of the present disclosure, an image capture device is disclosed that includes: a body that defines a front surface and a rear surface; a first integrated sensor-lens assembly (ISLA) that is supported by the body adjacent to the front surface; and a second ISLA that is supported by the body adjacent to the rear surface. The first ISLA defines a first optical axis that is oriented in non-orthogonal relation to the front surface, and the second ISLA defines a second optical axis that is oriented in non-orthogonal relation to the rear surface.

In certain embodiments, the first ISLA and the second ISLA may be eccentrically positioned along a vertical height of the body.

In certain embodiments, the first ISLA and the second ISLA may be positioned generally adjacent to a bottom surface of the body, which extends between the front surface and the rear surface.

In certain embodiments, the first ISLA and the second ISLA may be aligned.

In certain embodiments, the first ISLA and the second ISLA may be misaligned.

In another aspect of the present disclosure, an image capture device is disclosed that includes: a body; a first integrated sensor-lens assembly (ISLA) that is supported by the body and which is oriented in a first direction; and a second ISLA that is supported by the body and which is oriented in a second direction that is opposite to the first direction. The first ISLA and the second ISLA are each configured in a tilted orientation so as to define first and second stitch distances that are unequal.

In certain embodiments, the body may include: a front surface supporting the first ISLA; a rear surface supporting the second ISLA; and a top surface and a bottom surface each extending between the front surface and the rear surface.

In certain embodiments, the first ISLA and the second ISLA may be supported by the body so as to define a first distance with the top surface and a second distance with the bottom surface.

In certain embodiments, the first ISLA and the second ISLA may be supported by the body such that the first distance exceeds the second distance.

In certain embodiments, the first ISLA and the second ISLA may be supported by the body such that the second distance exceeds the first distance.

In certain embodiments, the first ISLA may define a first optical axis, and the second ISLA may define a second optical axis that is offset from the first optical axis.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure describes omnidirectional image capture devices with improved image capture capabilities that allow for the exclusion of extraneous objects from spherical images with reduced stitch distances. As indicated above, large stitch distances may result in potential reductions in image quality due to pixel sacrifice, loss of resolution, etc. Large stitch distances also impose limits on the dimensions of the image capture device (e.g., increased depth in the Z-direction), however, which can restrict the space available for and, thus, the size of, the power source, the (LED) display, etc.

In order to reduce stitch distances without potential reductions in image quality, the image capture devices described herein include tilted ISLAs (or ISLAs with tilted lenses). More specifically, the ISLAs described herein are configured so as to define optical axes that extend in non-parallel relation to each other and in non-orthogonal relation to the front and rear surfaces of the image capture device.

Figure 1A:
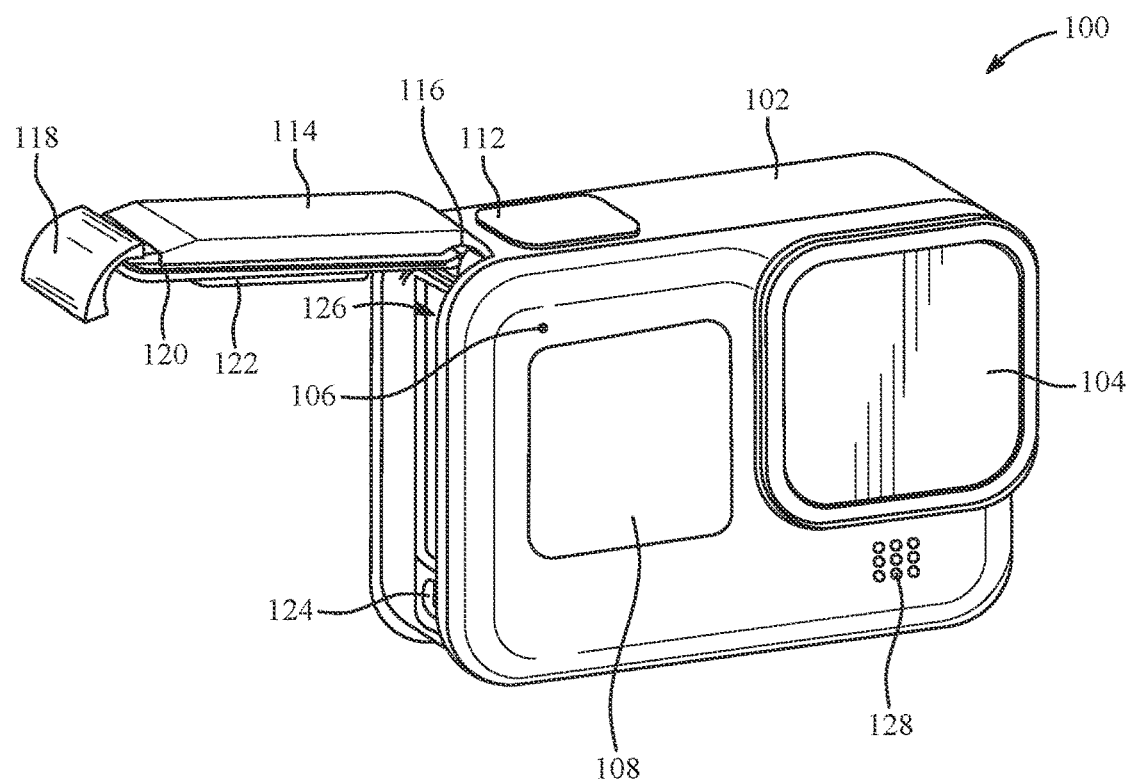
FIGS. 1A-B are isometric views of an example of an image capture device.
Figure 1B:
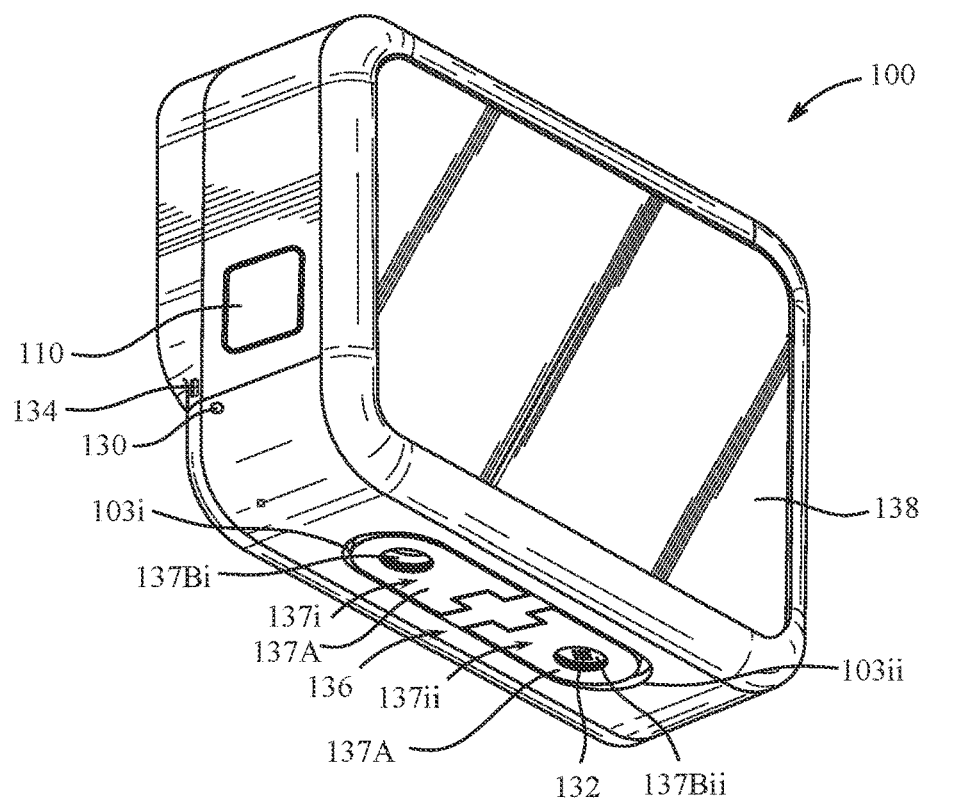

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include a (first) interconnect mechanism 136 that is configured for engagement with (connecting to) an accessory, handle, grip, etc., such that the image capture device 100 is (repeatably) connectable to the accessory via the interconnect mechanism 136. In the example shown in FIG. 1B, the interconnect mechanism 136 includes folding protrusions 137 (e.g., fingers 137A) that are configured to move between a nested (collapsed) position (FIG. 1B) and an extended (open) position (FIGS. 2A, 2B) that facilitates coupling of the protrusions 137 to mating protrusions of other devices such as accessories, handle grips, mounts, clips, or like devices, as discussed in further detail below. More specifically, the interconnect mechanism 136 includes a (first) protrusion 137*i* defining a (first) opening 137Bi and a (second) protrusion 137*ii* defining a (second) opening 137Bii, which are moveable between the nested and extended positions independently of each other. As seen in FIG. 1B, for example, when the protrusions 137 are in the nested position, the protrusions 137 are received within (accommodated by) corresponding cavities 103, which extend (vertically upward) into the body 102 (e.g., towards the shutter button 112), and when the protrusions 137 are in the extended position, the protrusions 137 are removed from the cavities 103 such that the protrusions 137 extend (vertically downward) from the body (e.g., away from the shutter button 112). More specifically, the body 102 includes a (first) cavity 103*i* that is configured to receive the protrusion 137*i* when the protrusion 137*i* is in the nested position and a (second) cavity 103*ii* that is configured to receive the protrusion 137*ii* when the protrusion 137*ii* is in the nested position. To facilitate reception of the protrusions 137, the cavities 103 include identical (or generally identical) configurations, which correspond to those defined by the protrusions 137. As such, in the illustrated embodiment, the cavities 103 each include a D-shaped (or generally D-shaped) transverse (e.g., horizontal) cross-sectional configuration. It should be appreciated, however, that the particular configurations of the protrusions 137 and the cavities 103 may be altered in various embodiments without departing from the scope of the present disclosure.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figures 2A, 2B:
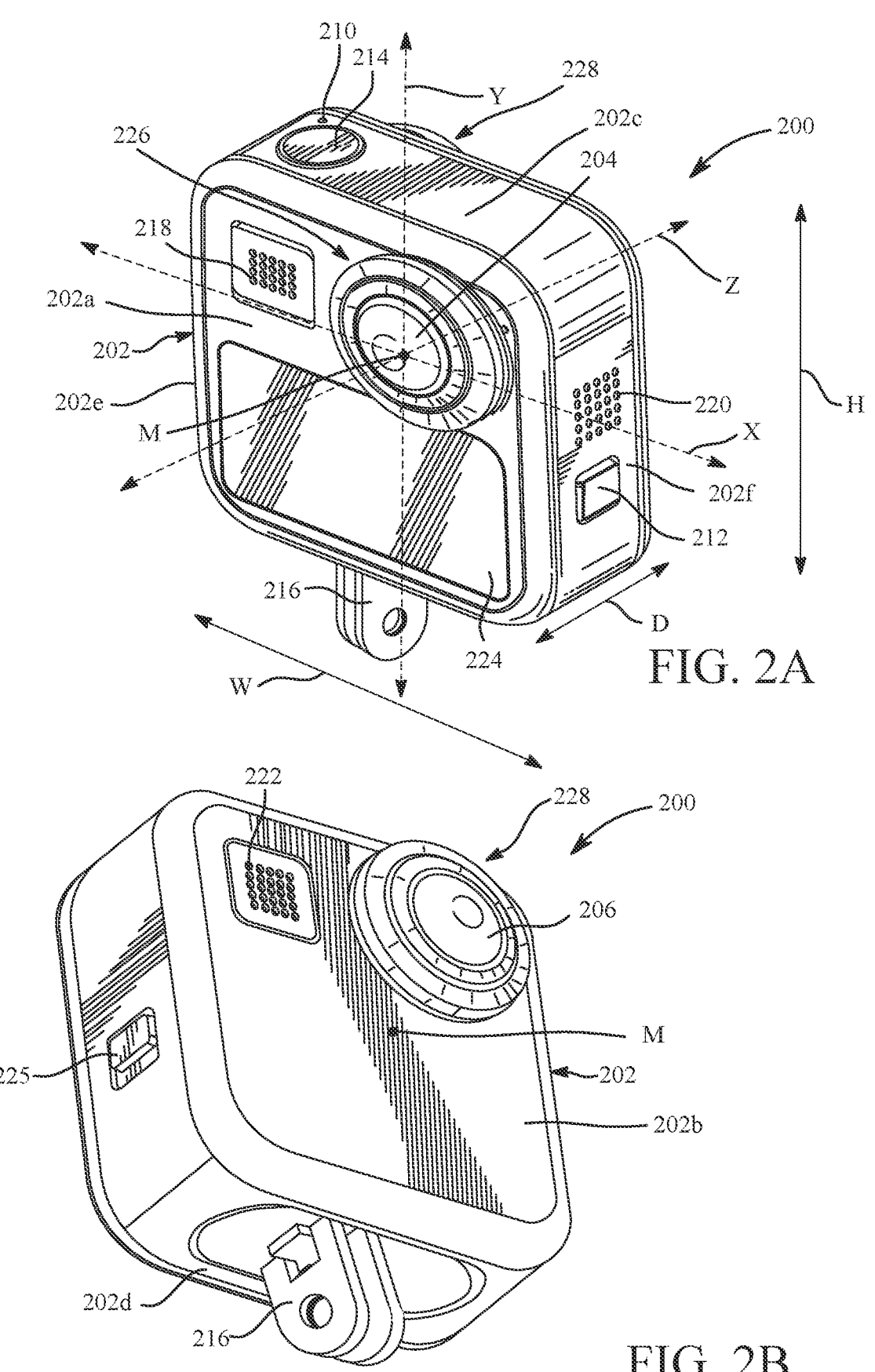
FIGS. 2A-B are isometric views of another example of an image capture device.

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass and defines: a front surface 202a; a rear surface 202b; a depth D that extends between the front surface 202a and the rear surface 202b along a (first) axis Z; a top (upper) surface 202c; a bottom (lower) surface 202d; a (vertical) height H that extends between the top surface 202c and the bottom surface 202d along a (second) axis Y; a (first) lateral surface 202e; a (second) lateral surface 202f; and a (lateral) width W that extends between the lateral surfaces 202e, 202f along a (third) axis X.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
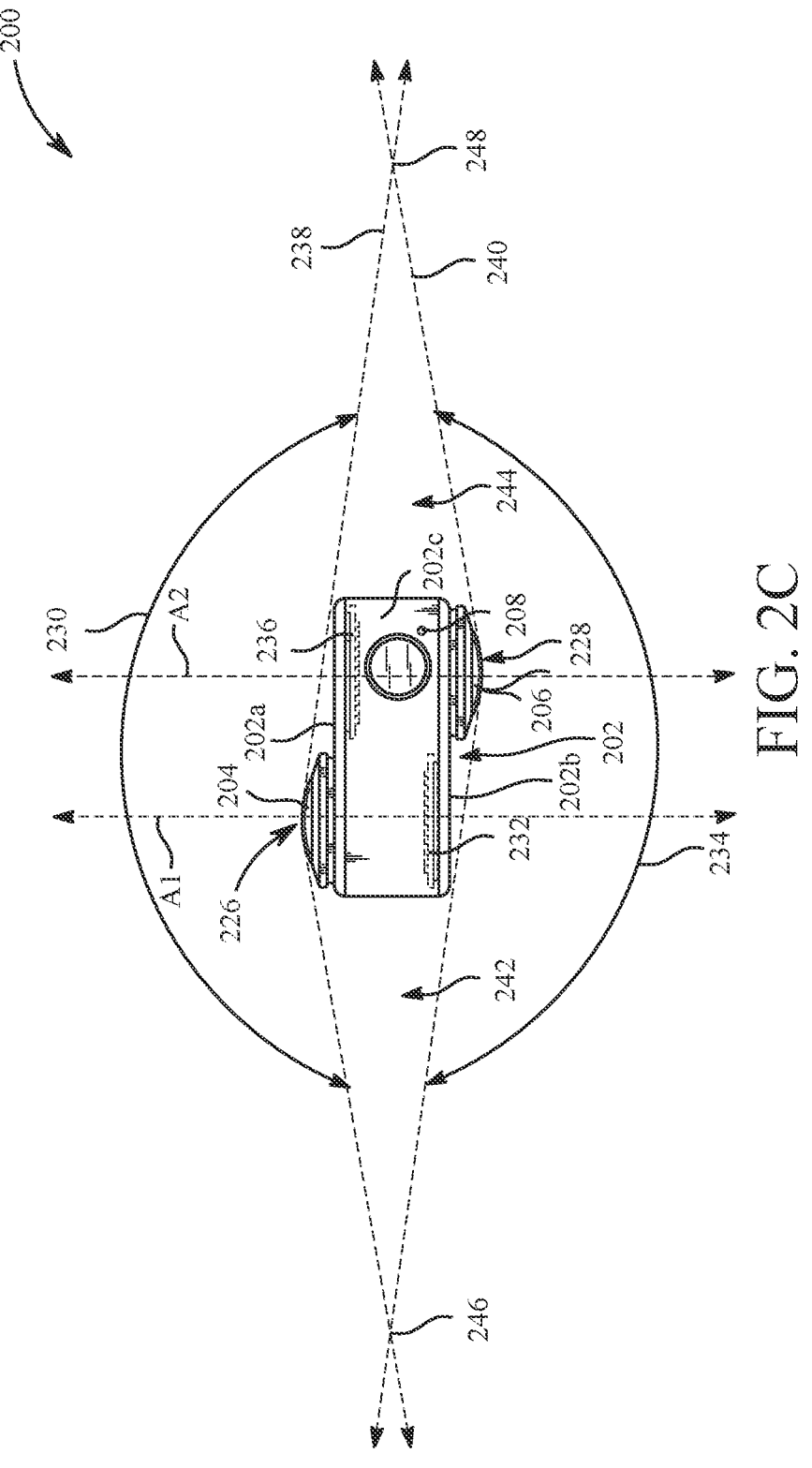
FIG. 2C is a top view of the image capture device of FIGS. 2A-B.
Figure 2D:
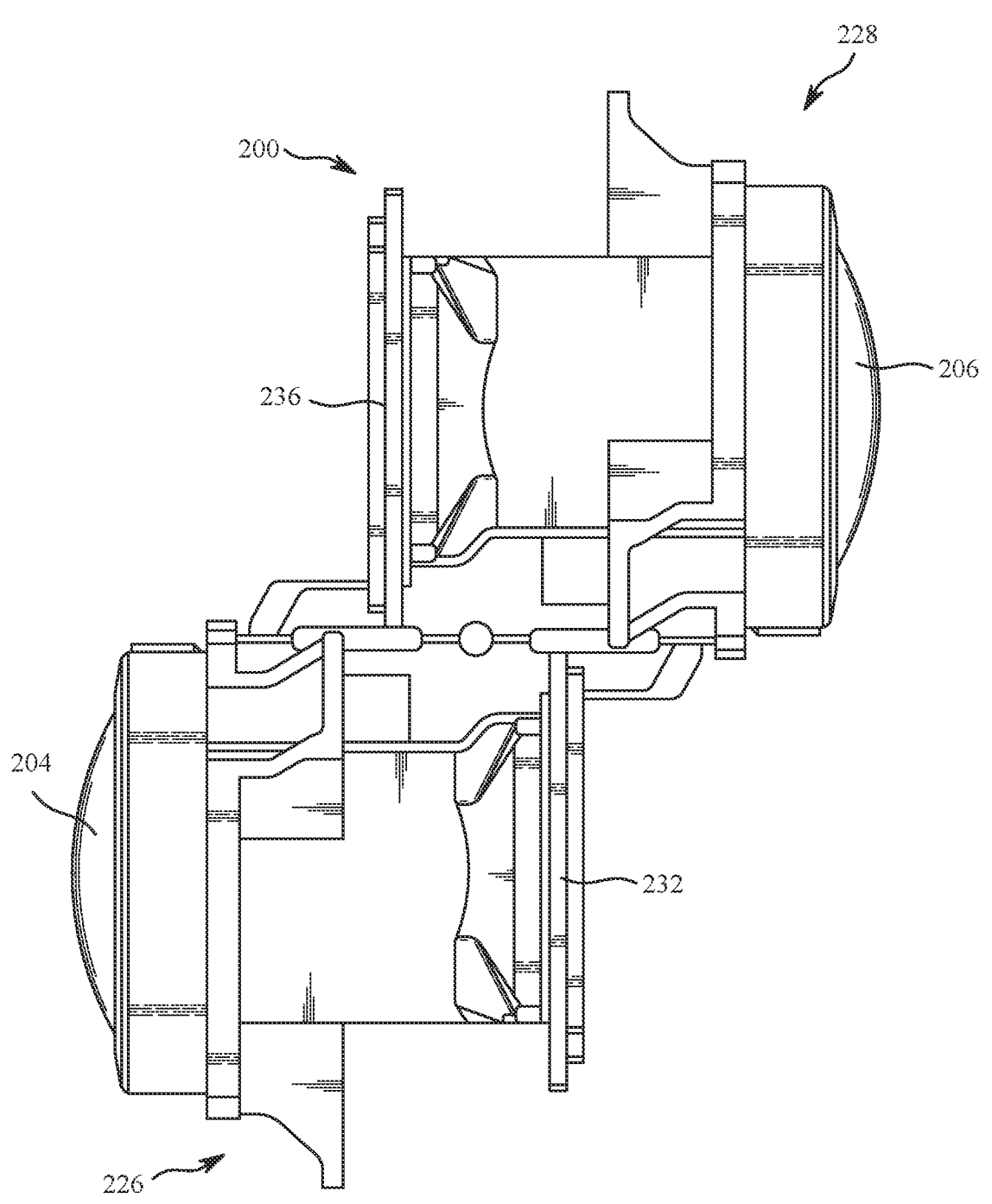
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device (e.g., an integrated sensor-lens assembly (ISLA)) 226 defining a first optical axis A1 and a second image capture device (e.g., an ISLA) 228 defining a second optical axis A2. The first image capture device (ISLA) 226 defines a first field-of-view 230 and includes the lens 204 that receives and directs light onto a first image sensor 232. Similarly, the second image capture device (ISLA) 228 defines a second field-of-view 234 and includes the lens 206 that receives and directs light onto a second image sensor 236. To facilitate the capture of spherical images, the image capture devices (ISLAs) 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone" ("blind spot"). In the dead zone, light may be obscured from the lenses 204, 206 and the corresponding image sensors 232, 236, and content in the blind spots 242, 244 may be omitted from capture. In some implementations, the image capture devices (ISLAs) 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices (ISLAs) 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices (ISLAs) 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

Figure 3:
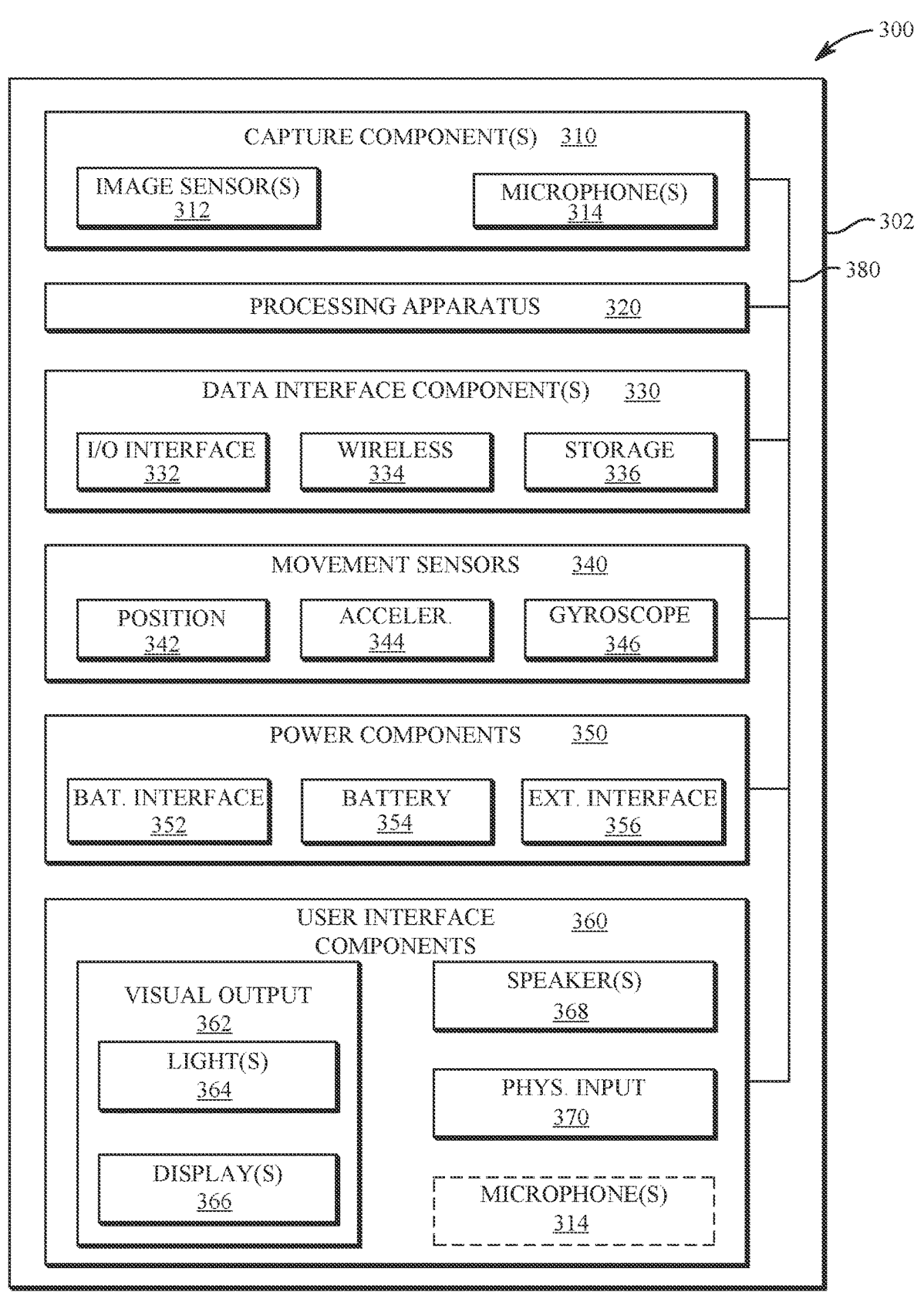
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
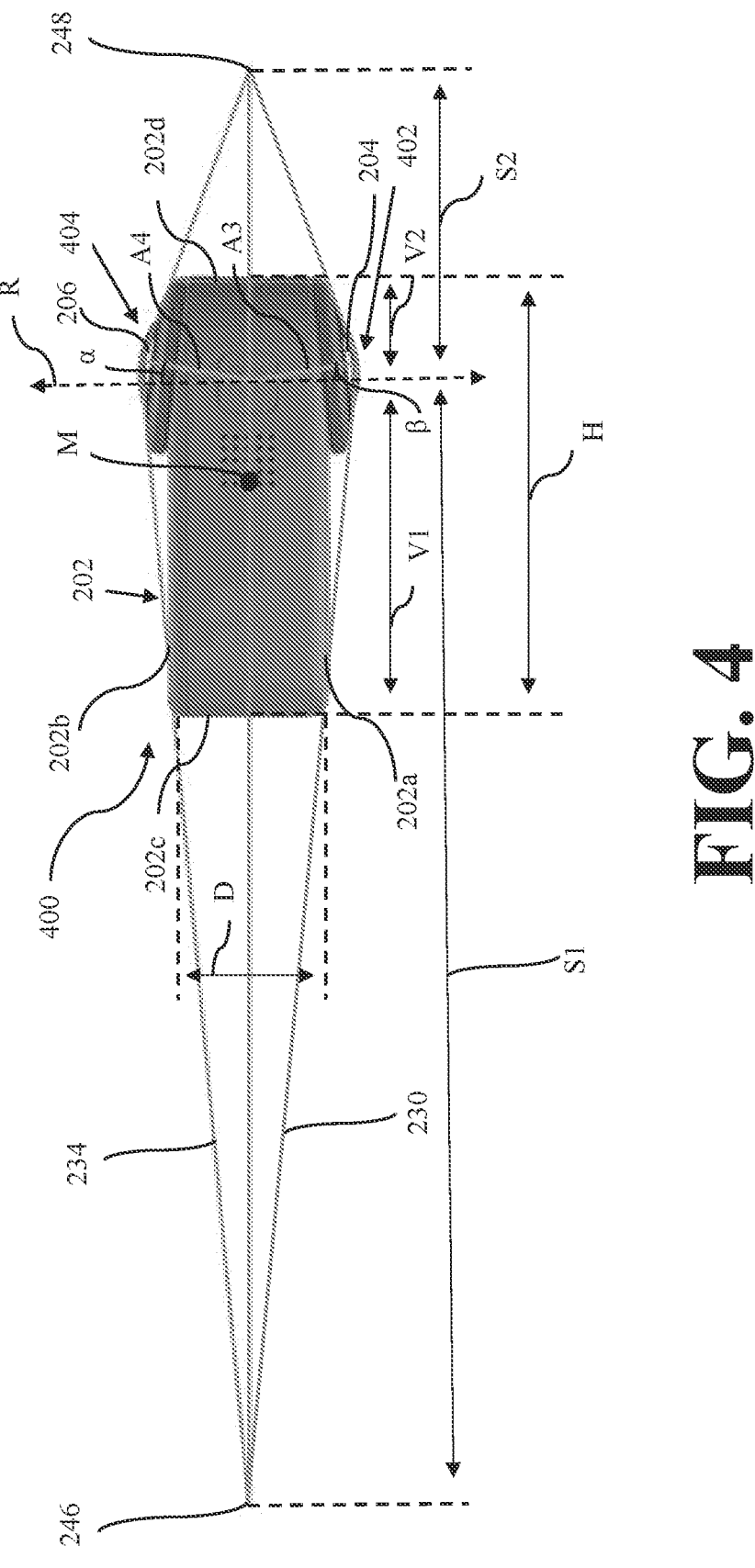
FIG. 4 is a side, plan view of an omnidirectional image capture device according to the principles of the present disclosure, which includes first and second ISLAs that are each positioned generally adjacent to a bottom surface thereof and which include tilted configurations.
Figure 5:
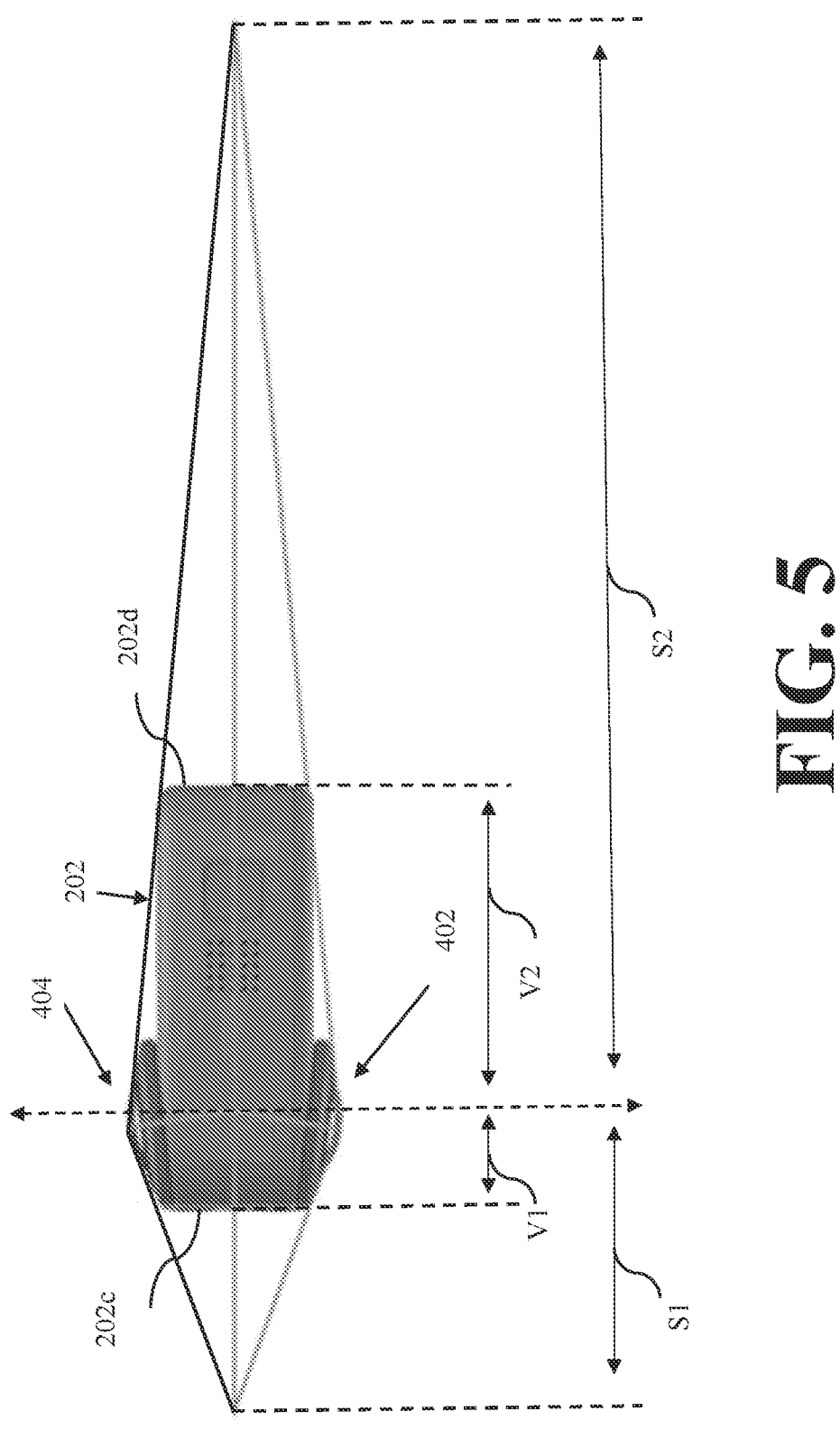
FIG. 5 is a side, plan view of an alternate embodiment of the omnidirectional image capture device seen in FIG. 4 in which the ISLAs are positioned generally adjacent to a top surface thereof.

Referring now to FIGS. 4-5, an image capture device 400 will be discussed, which is an alternate embodiment of the image capture device 200 (FIGS. 2A-2D). The image capture device 400 is substantially similar to the image capture device 200 and, accordingly, will only be discussed with respect to any differences therefrom in the interest of brevity. As such, identical reference characters will be utilized to refer to elements, structures, features, etc., common to the image capture device 200 and the image capture device 400.

Like the image capture device 200, the image capture device 400 is omnidirectional in that it includes a pair of ISLAs 402, 404 defining respective optical axes A3, A4. The ISLAs 402, 404 are substantially similar to the ISLAs 226, 228 (FIGS. 2A-2D) but for the tilted orientations (configurations) thereof, as described in further detail below. The ISLAs 402, 404 are supported by the body 202 and are oriented in opposite directions. More specifically, the ISLA 402 is supported by (e.g., is connected and/or positioned adjacent to) the front surface 202a of the body 202 such that the ISLA 402 is oriented (faces in) a first (e.g., forward) direction, and the ISLA 404 is supported by (e.g., is connected and/or positioned adjacent to) the rear surface 202b of the body 202 such that ISLA 404 is oriented (faces in) a second (e.g., rear) direction.

In contrast to the image capture device 200, in which the ISLAs 226, 228 are configured in a non-titled orientation, whereby the optical axes A1, A2 (FIG. 2C) extend in generally parallel relation to each other and in generally perpendicular (orthogonal) relation to the respective front and rear surfaces 202*a*, 202*b* of the body 202, the ISLAs 402, 404 are each configured in a tilted orientation, whereby the optical axes A3, A4 extend in non-parallel (e.g., inter- secting) relation to each other and in non-perpendicular relation to the respective front and rear surfaces 202*a*, 202*b* of the body 202. More specifically, the ISLAs 226, 228 are configured such that the optical axes A3, A4 respectively subtend (first and second) acute angles α, β (e.g., angles greater than 0 degrees) with a reference axis R that extends in generally parallel relation to the depth D of the (omnidi- rectional) image capture device 400. For example, in the embodiment illustrated, such that the angles α, β are gen- erally identical and lie substantially within the range of (approximately) 2 degrees to (approximately) 45 degrees. Embodiments in which the angles α, β may be non-identical are also envisioned herein, however, as are embodiments in which the angles α, β may lie outside the disclosed numeri- cal range. For example, depending upon the particular configuration of the image capture device 400, it is envi- sioned that the ISLAs 226, 228 may be configured such that the angles α, β are less than 1 degree.

In the embodiment illustrated, the ISLAs 402, 404 are eccentrically positioned along the height H (e.g., such that the ISLAs 402, 404 are located vertically off-center from a midpoint M (FIGS. 2A, 2B, 4) of the body 202), whereby the ISLAs 402, 404 (e.g., the optical axes A3, A4) respectively define a (first) vertical distance V1 with the top surface 202*c* and a (second) vertical distance V2 with the bottom surface 202*d* (the vertical distances V1, V2 being measured from points aligned with (e.g., along) the optical axes A3, A4 and the midpoint M). Although shown as being positioned generally adjacent to the bottom surface 202*d* of the body 202 (e.g., such that the distance V1 exceeds the distance V2), embodiments are also envisioned in which the ISLAs 402, 404 may be positioned generally adjacent to the top surface 202*c* of the body 202 (e.g., such that the distance V2 exceeds the distance V1), as seen in FIG. 5. Additionally, while the ISLAs 402, 404 are shown as being vertically aligned (e.g., positioned at substantially the same location along the height H of the body 202), depending upon the configuration of the image capture device 400, embodiments are also envisioned in which the ISLAs 402, 404 may be vertically misaligned (e.g., such that the ISLAs 402, 404 are positioned at different locations along the height H).

In one embodiment of the disclosure, it is envisioned that the ISLAs 402, 404 may be eccentrically positioned along the width W of the body 202 and laterally misaligned, as illustrated in FIGS. 2A, 2B, such that the optical axes A3, A4 are laterally offset and are each spaced (horizontally) from the midpoint M of the body 202. Embodiments are also envisioned, however, in which the ISLAs 402, 404 may be laterally aligned, as illustrated in FIG. 4. More specifically, in the embodiment illustrated in FIG. 4, the ISLAs 402, 404 and the optical axes A3, A4 respectively defined thereby are laterally (horizontally) aligned with each other (and the midpoint M) and are generally centered relative to the respective front and rear surfaces 202*a*, 202*b* along the width W (FIG. 2A) of the body 202.

As seen in FIG. 4, due to the tilted configurations of the ISLAs 402, 404, the stitch points 246, 248 defined by the overlapping fields-of-view 230, 234 are spaced from the lenses 204, 206 (e.g., the optical axes A3, A4), respectively, so as to define unequal stitch distances S1, S2, whereby tilting of the ISLAs 402, 404 increases one of the stitch distances S1, S2 while reducing the other. More specifically, in the particular embodiment illustrated, due to the configu- ration of the image capture device 400 and positioning of the ISLAs 402, 404 generally adjacent to the bottom surface 202*d*, tilting of the ISLAs 402, 404 increases the stitch distance S1 while reducing the stitch distance S2 (e.g., such that the stitch distance S1 exceed the stitch distance S2). Embodiments are also envisioned, however, in which the image capture device 400 may be configured, and the ISLAs 402, 404 may be tilted, such that the stitch distance S2 exceeds the stitch distance S1, as illustrated in connection with the embodiment seen in FIG. 5.

Titling of the ISLAs 402, 404 inhibits (if not entirely prevents) the inclusion of extraneous objects in the captured content, thereby increasing (e.g., maximizing) the area (and use) of the image sensors 232, 236 (FIGS. 2C, 2D) and reducing (if not entirely eliminating) the need for any artificial, algorithmic increases in the stitch distance S1 and/or the stitch distance S2 that may otherwise be required to remove the extraneous object(s).

Figure 6:
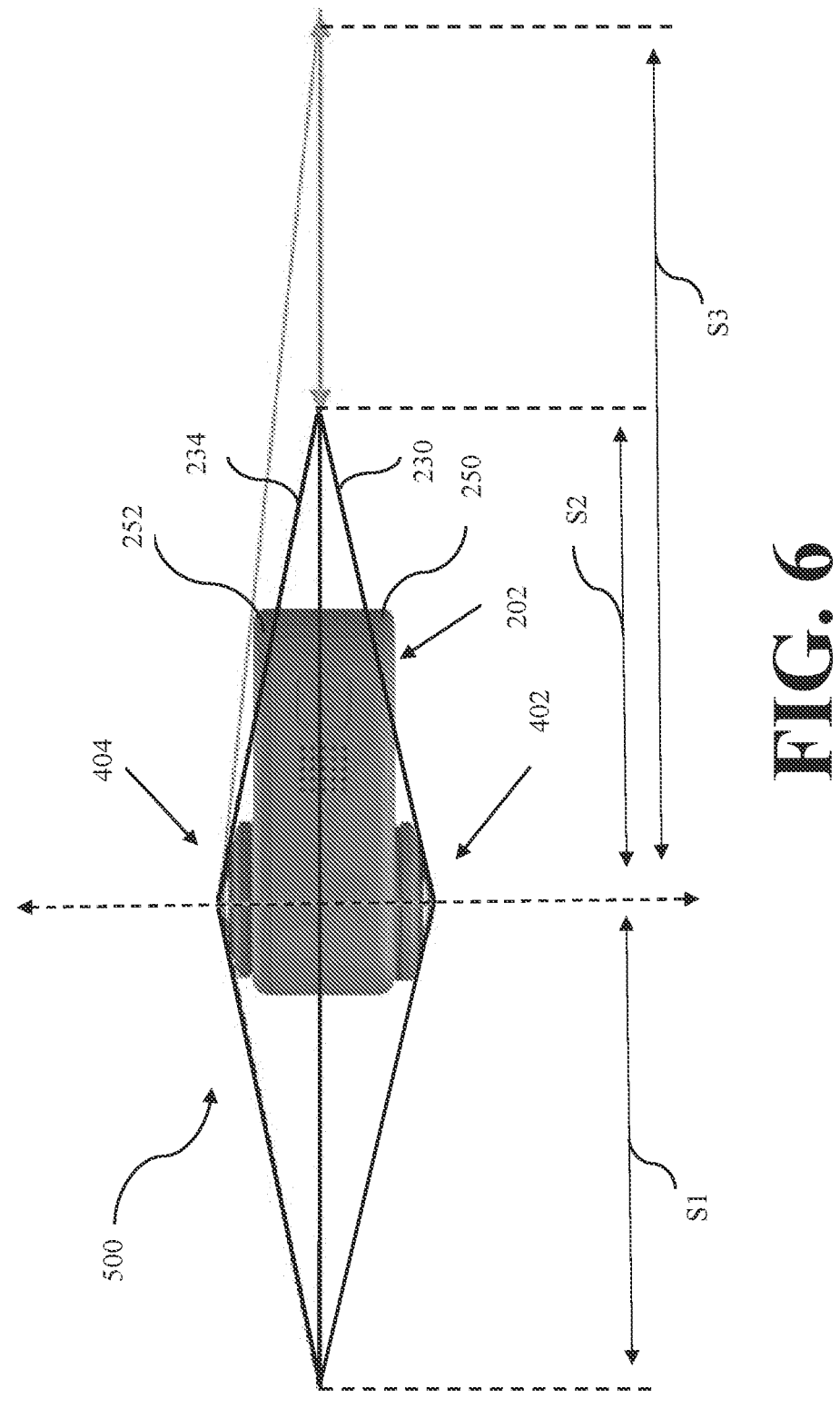
FIG. 6 is a side, plan view of an omnidirectional image capture device in which the ISLAs include non-tilted configurations.

For example, FIG. 6 illustrates an image capture device 500, which is an alternate embodiment of the image capture device 400 and is identical thereto but for omission of any tilting in the ISLAs 402, 404. As seen in FIG. 6, corner sections 250, 252 of the body 202 lie within the fields-of- view 230, 234 and are thus present within the content captured the by ISLAs 402, 404, which results in underuti- lization of the image sensors 232, 236 (FIGS. 2C, 2D), respectively. In order to remove the corner sections 250, 252 from the spherical image that it ultimately output (gener- ated) by the image capture device 500, the actual stitch distance S2 is algorithmically increased to an artificial stitch distance S3. As indicated above, however, artificially increasing the stitch distance S2 may result in reduced image quality due to pixel sacrifice, loss of resolution, clarity, etc. Any such loss in image quality can be reduced (if not entirely eliminated) via the tilted ISLAs 402, 404 (FIG. 4) included in the image capture device 400, thereby increasing (e.g., maximizing) utilization of the image sensors 232, 236 and, thus, resolution, clarity, etc., as well as the accuracy of the captured content.

With reference again to FIG. 4, due to the particular location of the ISLAs 402, 404 generally adjacent to the bottom surface 202*d* of the body 202, tilting of the ISLAs 402, 404 reduces the stitch distance S2 while increasing the stitch distance S1 without any effective loss of image quality, resolution, clarity, etc., as the stitch distance S1 would nevertheless be artificially (e.g., algorithmically) increased by the image capture device 400 so as to remove any (corner) sections of the image capture device 400 that may otherwise be present in the spherical image. As a result of the reduced stitch distance S2, the fields-of-view 230, 234 are increased, which allows for increased content capture by the image capture device 400. For example, by increasing the fields-of-view 230, 234, it is envisioned that more of the user's hand or helmet can be captured so as to output (generate) a more realistic spherical image.

While the present disclosure has been described in con- nection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is per- mitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±25%). The term "generally parallel" should thus be understood as encompassing configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture device comprising:
a body;
a first integrated sensor-lens assembly (ISLA) supported by the body, the first ISLA oriented in a first direction and defining a first optical axis; and
a second ISLA supported by the body, the second ISLA oriented in a second direction opposite to the first direction and defining a second optical axis extending in non-parallel relation to the first optical axis, wherein the body defines:
a front surface supporting the first ISLA;
a rear surface supporting the second ISLA;
a top surface, a bottom surface, a first lateral surface, and a second lateral surface each extending between the front surface and the rear surface;
a depth extending between the front surface and the rear surface;
a height extending between the top surface and the bottom surface; and
a width extending between the first lateral surface and the second lateral surface.

2. The image capture device of claim 1, wherein the first ISLA and the second ISLA are each configured in a tilted orientation.

3. The image capture device of claim 1, wherein the first ISLA and the second ISLA are configured such that the first optical axis and the second optical axis respectively subtend acute first and second angles with a reference axis extending in generally parallel relation to the depth of the image capture device.

4. The image capture device of claim 3, wherein the acute first and second angles lie substantially within a range of approximately 5 degrees to approximately 45 degrees.

5. The image capture device of claim 3, wherein the acute first and second angles are generally identical.

6. The image capture device of claim 1, wherein the first ISLA and the second ISLA are eccentrically positioned along the height of the body.

7. The image capture device of claim 6, wherein the first ISLA and the second ISLA are positioned generally adjacent to the bottom surface of the body or the top surface of the body.

8. The image capture device of claim 1, wherein the first ISLA and the second ISLA are eccentrically positioned along the width of the body.

9. The image capture device of claim 8, wherein the first ISLA and the second ISLA are misaligned.

10. An image capture device comprising:
a body defining a front surface and a rear surface;
a first integrated sensor-lens assembly (ISLA) supported by the body adjacent to the front surface, the first ISLA defining a first optical axis oriented in non-orthogonal relation to the front surface; and
a second ISLA supported by the body adjacent to the rear surface, the second ISLA defining a second optical axis oriented in non-orthogonal relation to the rear surface, wherein the body further includes:

a top surface and a bottom surface each extending between the front surface and the rear surface, wherein the first ISLA and the second ISLA are supported by the body so as to define a first distance with the top surface and a second distance with the bottom surface, wherein the first ISLA and the second ISLA are eccentrically positioned along a vertical height of the body such that the first distance exceeds the second distance or the second distance exceeds the first distance.

11. The image capture device of claim 10, wherein the first ISLA and the second ISLA are positioned generally adjacent to a bottom surface of the body extending between the front surface and the rear surface.

12. The image capture device of claim 11, wherein the first ISLA and the second ISLA are aligned.

13. The image capture device of claim 11, wherein the first ISLA and the second ISLA are misaligned.

14. The image capture device of claim 10, wherein the first ISLA and the second ISLA are each configured in a tilted orientation.

15. The image capture device of claim 14, wherein the first ISLA and the second ISLA are configured such that the first optical axis and the second optical axis respectively subtend acute first and second angles with a reference axis extending between and in generally orthogonal relation to the front surface and the rear surface.

16. The image capture device of claim 15, wherein the acute first and second angles lie substantially within a range of approximately 5 degrees to approximately 45 degrees.

17. An image capture device comprising:
a body;
a first integrated sensor-lens assembly (ISLA) supported by the body and oriented in a first direction; and
a second ISLA supported by the body and oriented in a second direction opposite to the first direction, wherein the first ISLA and the second ISLA are each configured in a tilted orientation so as to define first and second stitch distances that are unequal, wherein the body includes:
a front surface supporting the first ISLA;
a rear surface supporting the second ISLA; and
a top surface and a bottom surface each extending between the front surface and the rear surface, wherein the first ISLA and the second ISLA are supported by the body so as to define a first distance with the top surface and a second distance with the bottom surface.

18. The image capture device of claim 17, wherein the first ISLA and the second ISLA are supported by the body such that the first distance exceeds the second distance.

19. The image capture device of claim 17, wherein the first ISLA and the second ISLA are supported by the body such that the second distance exceeds the first distance.

20. The image capture device of claim 17, wherein the first ISLA defines a first optical axis, and the second ISLA defines a second optical axis offset from the first optical axis.

* * * * *